United States Patent [19]
Ohlberg et al.

[11] 3,753,674
[45] Aug. 21, 1973

[54] THERMAL TEMPERING OF GLASS HAVING SHORT STRAIN POINT-TO-SOFTENING POINT INTERVAL

[75] Inventors: Stanley M. Ohlberg, Pittsburgh; Leighton E. Orr, Tarentum, both of Pa.

[73] Assignee: PPG Industries, Inc., Pittsburgh, Pa.

[22] Filed: Jan. 18, 1971

[21] Appl. No.: 107,353

Related U.S. Application Data
[63] Continuation-in-part of Ser. No. 10,641, Feb. 11, 1970, abandoned.

[52] U.S. Cl............................ 65/114, 65/116, 65/30, 65/134
[51] Int. Cl............................................. C03b 27/00
[58] Field of Search................... 65/114, 116, 117, 65/30

[56] References Cited
UNITED STATES PATENTS

| | | |
|---|---|---|
| 2,198,739 | 4/1940 | Phillips ............................. 65/116 |
| 2,285,596 | 6/1942 | Littleton et al. ...................... 65/116 |
| 2,285,595 | 6/1942 | Littleton et al. ...................... 65/116 |
| 2,311,846 | 2/1943 | Littleton et al. ................... 65/114 X |
| 3,620,706 | 11/1971 | Spanoudis........................ 65/114 X |
| 2,418,489 | 4/1947 | Tillyer................................. 65/117 |
| 3,595,725 | 7/1971 | Coen................................. 65/114 X |

OTHER PUBLICATIONS

Glass, The Miracle Maker, by C. J. Phillips, pages 97 to 100

*Primary Examiner*—Frank W. Miga
*Attorney*—Chisholm & Spencer

[57] ABSTRACT

Thermal tempering propensity of alkali-alkaline earth-silica glass can be enhanced by changing the chemical composition such that the temperature interval between the softening point and the strain point is decreased. Addition of $B_2O_3$ and/or $TiO_2$ in commercial alkali-alkaline earth-silica glass yields the above-mentioned result.

5 Claims, 2 Drawing Figures

SPECIFIC VOLUME v. TEMPERATURE

THERMAL TEMPERING OF GLASS HAVING SHORT STRAIN POINT-TO-SOFTENING POINT INTERVAL

CROSS-REFERENCES TO RELATED APPLICATIONS

This application is a continuation-in-part of application Ser. No. 10,641, filed Feb. 11, 1970 now abandoned.

BACKGROUND OF THE INVENTION

This invention relates to thermal tempering of commercial alkali-alkaline earth-silica glasses.

More particularly this invention relates to an improved thermal tempering method for glass based upon any commonly known or contemplated thermal tempering method by altering the composition of glasses to be tempered by the controlled addition of selected ingredients in minor amounts to restrict the interval between strain point and softening point of the glass being treated and to increase the rate of specific volume change of the glass between its strain point and softening point.

In another aspect this invention relates most particularly to thermally tempered flat glass articles of superior strength in thicknesses less than the minimum thicknesses heretofore capable of being thermally tempered.

Thermal tempering of glass is a well-known art. It is recognized, at least by Littleton in U. S. Pat. Nos. 2,231,811, 2,285,595, and 2,311,846, that an important factor to be considered in determining retention of temper is the interval between the softening and strain point; but Littleton does not suggest that decreasing the softening point-strain point interval enhances tempering propensity.

Three articles, "Effect of Boric Oxide on Properties of Soda-Dolomitic Lime-Silica Glass," Owens-Illinois Glass Company General Research Laboratory, *J. Am. Ceram. Soc.*, Vol. 31, No. 1, pp. 8–14 (1952), "Influence of $TiO_2$ on the Properties of Alkali-Lime-Silica Glasses. Part I," Atma Ram et al., *C.G.C.R.I. Bull.*, Vol. 2, No. 4, pp. 170–178 (1955), and "Influence of $TiO_2$ on the Viscosity and Surface Tension of Soda-Lime-Silica Glasses," Atma Ram et al., *Glass and Ceram. Bull.*, Vol. 6, No. 1, pp. 3–12 (1959), teach that $B_2O_3$ and $TiO_2$ respectively decrease the temperature interval between the softening point and the strain point. However, they make no mention of thermal tempering propensity.

Flat glass as used here includes sheet glass, plate glass and float glass of any size, quality or thickness, whether substantially flat or bent. The terms sheet, plate, and float glass are intended to describe, not only the method of forming such glasses, but also to describe the compositional character of such glasses as alkali-alkaline earth-silica glasses including commonly encountered minor constituents.

SUMMARY OF THE INVENTION

In the thermal tempering of alkali-alkaline earth-silica glasses selected minor constituents are added to glass compositions in amounts effective to decrease the softening point-strain point interval below about 350°F to enhance the thermal tempering using decreased rates of specific heat removal during quenching.

Sheets or plates of alkali-alkaline earth-silica glass containing effective amounts of $B_2O_3$ or $TiO_2$ or mixtures thereof are thermally tempered to achieve a surface compression in excess of about 18,000 pounds per square inch and a center tension in excess of about 8,250 pounds per square inch for glass having a thickness of less than about 0.1875 inch.

A continuous ribbon of alkali-alkaline earth-silica glass containing effective amounts of $B_2O_3$ or $TiO_2$ or mixtures thereof is formed to a thickness in the range from about 0.040 inch to about 0.090 inch as well as to greater thicknesses by floating such glass on a bath of molten tin in an inert atmosphere at about atmospheric pressure while applying attenuating forces only in the direction of ribbon movement. Thin glass so formed is then thermally tempered to provide thin glass articles of superior strength.

The invention results in improved thermal tempering propensity of commercial alkali-alkaline earth-silica glasses, which is attributed to the relatively narrow temperature interval between the strain point and the softening point. Some advantages of the invention include: stronger glass or thinner glass can be produced, there is a higher throughput rate, capital investment for blower capacity and furnace length is lowered, less fuel is required for melting, and there is less concern with devitrification in forming.

The advantages of the instant invention are achieved by employing $B_2O_3$ and/or $TiO_2$ such that the glass consists essentially by weight of 46–75 percent $SiO_2$, 0–15 percent CaO, 0–10 percent MgO, the combined weight of CaO and MgO ranging from 0–15 percent, 5–24 percent $Na_2O$, 0–21 percent $K_2O$, the combined weight of $Na_2O$ and $K_2O$ ranging from 5–24 percent, 1.7–22.4 percent $B_2O_3$ and/or 1.4–10 percent $TiO_2$, the combined weight of $B_2O_3$ and $TiO_2$ ranging from 2.5–22.4 percent.

Articles of flat glass comprising alkali-alkaline earth-silica glass having at least 60 percent by weight (calculated) silica, at least 5 percent by weight alkaline earth and about 5 to about 25 percent $K_2O$ and $Na_2O$ and an effective amount of $B_2O_3$, $TiO_2$ or mixtures thereof are thermally tempered by heating the glass to a temperature above the strain point, preferably above the anneal point and less than the softening point, and rapidly cooling or quenching the glass by contact with a quenching fluid to a temperature below the strain point thereafter cooling the glass to about room temperature. The glasses are characterized by a relatively narrow strain point-to-softening point interval and by a relatively high specific volume change with temperature variation in the strain point-to-softening point interval though not necessarily in the range of conventional coefficient of expansion determination.

As described below, conventional procedures exist for determining the strain point, the softening point and the specific volume of glasses. For a glass of any given composition the glass has a fixed strain point, a fixed softening point and a fixed specific volume at any given temperature. These properties are invariant for a particular glass within the limits of experimental error. The present invention depends upon the discovery that glasses which have relatively closely spaced strain points and softening points and which have a high specific volume change between their respective strain points and softening points are tempered more efficiently than are commonly known commercial glasses.

While no attempt is made here to theoretically explain why glasses having specific volume change rates or specific strain point to softening point intervals are more efficiently tempered than our other glasses, complete disclosure is made of the applicants' empirical observation that this is so.

DESCRIPTION OF THE PREFERRED EMBODIMENTS

Figure 1:
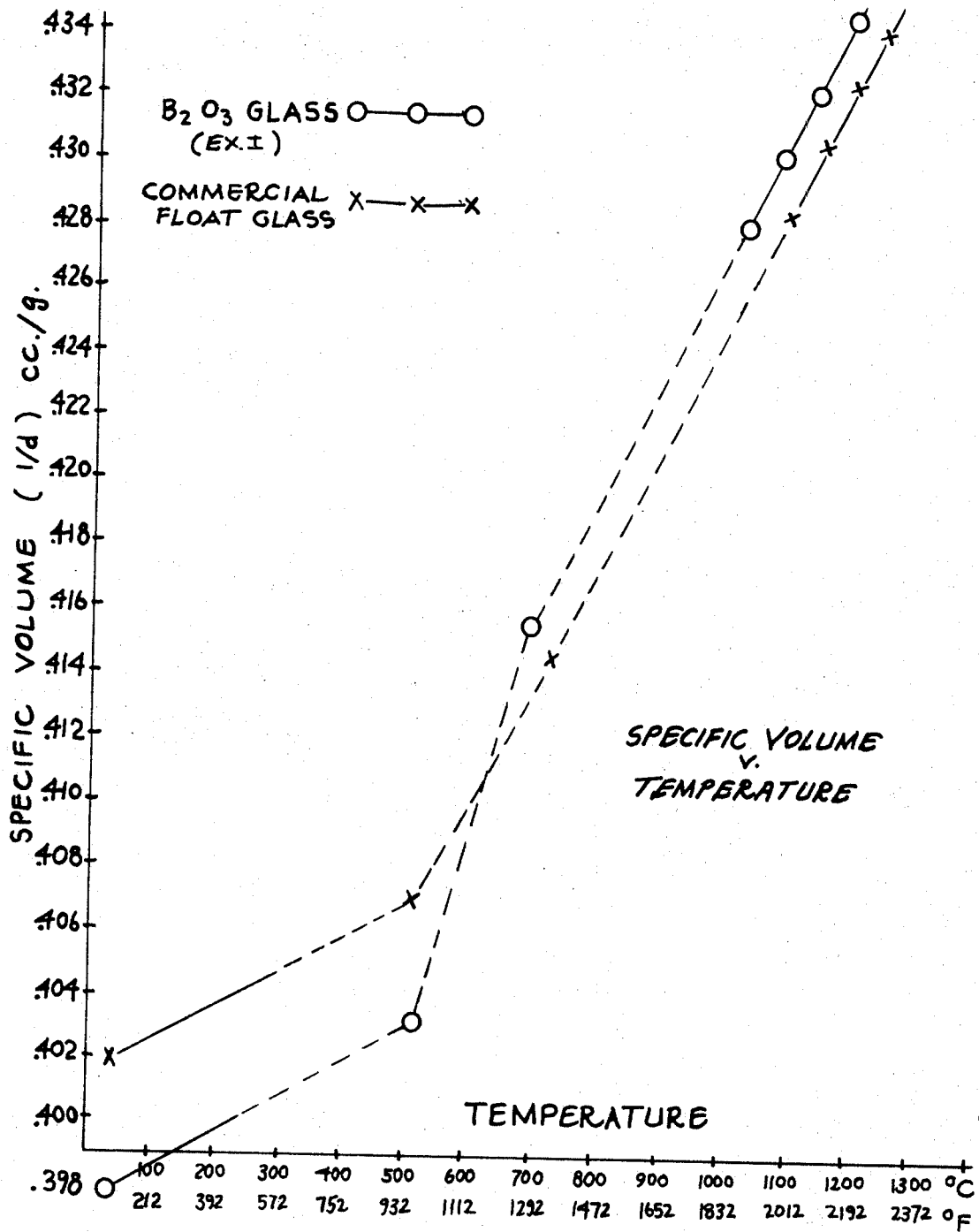
FIGS. 1 and 2 graphically show the short strain point-to-softening point interval, the great specific volume change apparent in that interval and the great rate of volume change within that interval of the glasses used in improved thermal tempering as compared with conventional float glass.

In accordance with the preferred embodiments of the present invention, a soda-lime-silica glass having the desired enhanced thermal tempering propensity is provided. Such a glass consists essentially by weight of 65–75 percent $SiO_2$, 6–18 percent $Na_2O$, 8–15 percent CaO plus MgO, 4–10 percent $B_2O_3$ and/or 4–10 percent $TiO_2$, the sum of $B_2O_3$ and $TiO_2$ being 4–10 percent.

While the controlled presence of either $B_2O_3$ or $TiO_2$ improves the thermal tempering properties of a soda-lime-silica glass, $B_2O_3$ is the preferred additive. $B_2O_3$ may be added in the amounts herein indicated to obtain the beneficial results disclosed for all clear and heat-absorbing glasses now commercially useful. In contrast, $TiO_2$ is of limited usefulness for producing heat-absorbing glasses of improved thermal tempering propensity. Its presence does, indeed, improve the thermal tempering character of a variety of commercial glasses, but when $TiO_2$ is present in heat-absorbing glasses, such as iron containing green or blue glasses, it has a detrimental effect upon color and duplication of the currently popular commercial colors is difficult.

The glasses of the invention can be produced from conventional glass-making materials properly compounded and thoroughly mixed so as to yield, when reacted, glasses of the desired ultimate composition. Suitable batch materials include sand, soda ash, dolomite, anhydrous boric acid, and salt cake. Various size pots or crucibles can be employed and the melting temperatures and times will vary according to the amount being formed. The glasses can be made and formed by conventional flat glass processes such as the float, sheet, and plate glass processes.

EXAMPLE I

| Batch Ingredient | Weight Parts (Pounds) |
|---|---|
| Sand | 1920 |
| Soda Ash | 715 |
| Dolomite | 542 |
| Al(OH)₃ | 8.5 |
| Anhydrous Boric Acid | 148 |
| Niter | 57 |
| Salt Cake ($Na_2SO_4$) | 9.5 |
| $Sb_2O_3$ (Optional) | 9.5 |
| Total | 3409.5 |

A pot glass batch, which is illustrative of the present invention, is prepared by thoroughly mixing the above batch ingredients. The batch is added to a pot which contains about 200 pounds of cullet having the same composition as the final glass, at 2,560°F over a period of 6 hours. After an additional four hours at this temperature, the glass is stirred for 8 hours at 2,620°F. Stirring is continued for another 8 hours as the temperature is decreased to 2,100°F. The stirrer is then removed and the glass is cast 8 hours later at 1,850°F. This pot batch yields approximately 3,000 pounds of glass after melting and fining.

The calculated composition of the above-given batch is:

| Component | Percent By Weight |
|---|---|
| $SiO_2$ | 68.63 |
| $B_2O_3$ | 4.87 |
| $Al_2O_3$ | .37 |
| MgO | 4.07 |
| CaO | 5.93 |
| $Na_2O$ | 15.60 |
| $Na_2SO_4$ | .50 |
| $Fe_2O_3$ | .03 |
| Total | 100.00 |

A sample of the above glass made by the pot method has the following properties:

| | |
|---|---|
| Strain point | 945°F |
| Softening point | 1283°F |
| Softening point-Strain Point interval | 338°F |

The following compositions are also illustrative of the instant invention:

TABLE I

| Component | Calculated percent by weight | | | | | Commercial | |
| | II | III | IV | V | VI | Float | Sheet |
|---|---|---|---|---|---|---|---|
| $SiO_2$ | 52.2 | 54.1 | 62.8 | 68.91 | 64.30 | 73.30 | 73.13 |
| $B_2O_3$ | 15.1 | 15.7 | 15.64 | | 4.93 | | |
| $TiO_2$ | | | | 6.26 | 4.44 | | |
| $Al_2O_3$ | | | | .31 | .37 | 0.11 | 1.21 |
| MgO | | | | 1.45 | 3.94 | 3.89 | 3.53 |
| CaO | 12.2 | 12.6 | 4.18 | 8.41 | 5.87 | 8.78 | 8.35 |
| $Na_2O$ | | 7.0 | 6.94 | 13.73 | 15.62 | 13.42 | 13.23 |
| $K_2O$ | 20.5 | 10.6 | 10.44 | | | .02 | 0.24 |
| NaCl | | | | .12 | | | |
| $Na_2SO_4$ | | | | .76 | .50 | | |
| $Fe_2O_3$ | | | | .05 | .03 | .114 | .11 |
| $SO_3$ | | | | | | .40 | .18 |
| Softening point (°F.) ASTM-C-338-57 (1968) | 1,402 | 1,279 | 1,328 | 1,318 | 1,275 | 1,338 | 1,355 |
| Strain point (°F.) ASTM-C-336-54T ASTM-C-336-69 | 1,085 | 1,005 | 1,015 | 995 | 955 | 945 | 945 |
| Softening strain point interval (°F.) | 317 | 274 | 313 | 323 | 320 | 393 | 410 |

Articles having the above six compositions and a float glass composition are tempered and subjected to various strength tests. In one laboratory test, rods of ⅛-inch diameter and 3-inch length are heated to an "optimum" temperature (experimentally defined for each composition as that temperature which yields the strongest glass), which is a furnace temperature, the glass temperature not being actually measured, held at the indicated optimum temperature for two minutes, and then quickly cooled by being allowed to fall freely into a quenching oil* (*Silicone oil such as General Electric GE–96–50) at room temperature. The tempered rods are subjected to a uniform and reproducible abrasion process described in detail below after which the fracture stress is determined using a four-point loading technique. The values for breaking stress given below are the average of ten measurements for each composition.

TABLE II

| Glass Composition | Optimum Temp. (°F) | Mean Stress at Fracture (psi) | Standard Deviation (psi) |
|---|---|---|---|
| Commercial Float | 1,436 | 28,478 | 3,674 |
| I | 1,401 | 41,031 | 4,021 |
| II | 1,362 | 54,067 | 3,406 |
| III | 1,436 | 42,991 | 2,837 |
| IV | 1,506 | 50,017 | 6,552 |
| V | 1,418 | 39,051 | 5,350 |
| VI | 1,436 | 39,161 | 3,799 |

The superior strengths of the six glass compositions of the instant invention compared to commercial float glass are readily apparent, ranging from a minimum increase of about 10,000 psi for Compositions V and VI, to a maximum increase of about 25,500 psi for Composition II.

When evaluating the fracture stress of a sample of glass specimens, wide divergence of experimental results is common if the specimens are tested without an effort to make uniform their surface characteristics. This is due, in all likelihood, to small surface defects such as small cracks, not uniformly found in each specimen. In order to confidently evaluate a strengthening process or a particular glass for strength it is desirable to evaluate a sample of several specimens and obtain reproducible results. By uniformly abrading specimens of strengthened glass, similar glasses, similarly treated yield nearly reproducible test results and testing confidence is improved. Nordberg et al. (*J. Am. Ceram. Soc.* 47, 215–219 (1964)) describes an abrading technique. The technique used here is a modification of Nordberg et al. and has been fully described in a paper before the American Ceramic Society, May 6, 1969.

In the present procedure the modification of Nordberg et al comprises: placing a wide mouth glass jar (16 oz., 6-inch height, 2.75-inch diameter) circumscribed by a pair of rubber O-rings in a roller mill aligned with its axis parallel to the axes of the rollers; placing about 200 cc of silicon carbide (SiC) grit which passes a U. S. No. 240 mesh screen in the jar; placing 10 glass rods, about 3 inches in length, in the jar; and rolling the jar about 15 minutes at 200 to 210 revolutions per minute.

The stress at fracture, determined by a four point loading technique follows basic elastic theory. The relationship is:

$$X = 8 \ WL/\pi ab^2, \text{ where}$$

$X$ is the stress at fracture in psi
$W$ is the total load in pounds
$L$ is the distance between support points and load points in inches
$a$ and $b$ are the large and small diameters respectively of the rod if not perfectly round in inches In another test, large plates of glass (44⅞ × 74⅞ × ⅛ inch) are tempered under similar conditions in an air support production system. The plates are heated to a temperature estimated as 1,200°F and the maximum air pressure used to quench the hot plates is about 20 ounces per square inch measured at the manifold of a conventional cooling system. The degree of temper is characterized by comparing particle size after fracture with a center punch, smaller particle size being evidence of greater degree of temper. For the conditions used, the largest particle for Example I weighed 0.05 grams, while the largest particle for a plate of commercial lime-sode-silica sheet glass composition weighed 8.0 grams.

In yet another test, ground and polished plates (3⁺ × 3⁺ × 0.118 inch) are tempered under the same conditions in an air support system. The plates are heated to 1,200°F and the maximum air pressure used to quench the hot plates is about 10 ounces per square inch. Stress at fracture was determined by a concentric ring loading technique using a load ring-to-support ring diameter ratio of 0.5 (i.e., a load ring of 1.5 inches and a support ring of 3 inches).

TABLE III

| Glass Composition | Mean Fracture Stress (psi) |
|---|---|
| Commercial plate, before temper | 12,400 |
| Example I, before temper | 8,150 |
| Commercial plate, after temper | 24,695 |
| Example I, after temper | 34,900 |

Again, there is more tempering in the glass of Example I than in the commercial plate composition. The commercial plate's strength increased by only about 12,000 psi while Example I's glass strength increased almost 27,000 psi to a strength exceeding the commercial plate's tempered strength by over 10,000 psi.

In a fourth test, automobile sidelights are made by a commercial press-bending and tong-tempering process. In this test, the tempering propensity is measured by the residual center tension, higher tension corresponding with higher compression and thus higher degree of temper. The center tension was 7,540 psi for a sidelight having the composition of Example I and 6,600 psi for the sidelight having the commercial float composition. The higher value found for the glass sheet having the composition of Example I is even more significant in view of the fact that the sheet was thinner for Example I than the float composition (0.185 inch vs. 0.198 inch).

Residual center tension is determined by a light scattering technique. Background references useful to an understanding of this technique include: Weller, R., "Three Dimensional Photoelasticity Using Scattered Light," *J. Appl. Phys.*, 12 (8), Aug. 1941, 610–616; Cheng, Y. F., "Some New Techniques for Scattered Light Photoelasticity," *Exp. Mech.*, 3 (11), Nov. 1963, 275–278; Bateson, S. et al., "Stress Measurements in Tempered Glass Plates by Scattered Light Method with a Laser Source." *Am. Ceram. Soc. Bul.*, 45, (2), Feb. 1966, 193–198.

Although not used here, the older quartz wedge technique fully described in U. S. Pat. No. 2,460,515 (1949) obtains equivalent results and remains most suited for low stress measurements and edge measurements.

In the present technique coherent light from a helium-neon laser source, having a wavelength of about 633 millimicrons, a beam width of about 0.015 inch diameter, and a beam divergence of about 0.003 radian is directed through the glass specimen to be tested along a plane parallel to the major surfaces of the specimen and about midway between them so that observed light and dark fringes of light are shifted a maximum toward the laser—this assures that the peak residual tension plane is being observed. As noted, light and dark fringes of light are observable along the beam length. This phenomenon is due to the light retardation effected by the polarizing influence of the principal stress. By the following relationship center tension may be determined.

$$CT = N \times 633 \text{ mmu}/L, \text{ where}$$

$CT$ is center tension in millimicrons per inch
$N$ is a number of recurring fringes along length $L$
$L$ is a length in inches selected to encompass an integer number of fringes N To convert the center tension to pounds per square inch the center tension above is multiplied by the stress optic coefficient of the glass tested. Commercial float glass has a stress optic coefficient of 2.26; commercial sheet glass has a coefficient of 2.31; and the $B_2O_3$ glasses here disclosed have a coefficient of 2.08.

In a further series of tests glass having a composition defined by Example I was melted and refined in a pilot tank furnace and formed by the float forming technique to evaluate the feasibility of commercially producing such glass and to produce sufficient glass for large scale tempering tests described below.

The glass useful for improved tempering has been found to possess favorable characteristics for melting and refining and it has been discovered that extremely thin glass can be float formed using the techniques of U. S. Pat. Nos. 3,241,938-9. The $B_2O_3$ glass of Example I melts readily at 2,550°F while commercial float glass must be melted above 2,670°F. Comparing float glass production on the same line as used for commercial compositions it has been found that this glass can be produced at a throughput increase of 12 percent (19 tons per day compared with 17 tons per day for commercial float composition). A decreased fuel usage is also noted for melting this glass; a reduction of about 10 percent is possible for fuel per ton of glass. A surprising decrease in seeds or bubbles is apparent for this glass refined under similar conditions to those for refining commercial float glass produced in the same furnace. This glass has 20 to 50 seeds per 6-inch square of ¼-inch glass compared with 90 to 400 for similarly prepared commercial float glass.

Float forming is particularly satisfactory using this glass composition. Continuous ribbons of glass can be formed having controlled thicknesses, such as one-fourth inch, seven thirty-secondths inch, three-sixteenths inch, 0.150 inch, one-eighth inch, 0.090 inch, 0.060 inch and 0.040 inch.

To establish the performance this glass float formed to thicknesses of one-eighth inch and 0.090 inch a series of tempering trials were conducted using conventional gas hearth tempering methods as described in U. S. Pat. No. 3,223,501, No. 3,481,724, and No. 3,409,422, FIG. 8.

Approximately 500 pieces of glass having the composition of Example I and float formed to a thickness of 0.125 inch are cut to a size of 5 inches-by-36 inches; a second sample of about 500 pieces having the same characteristics except being 0.090 inch thick are cut to the same size; and about 500 pieces of 0.125-inch commercial float glass are prepared having the same size.

A conventional gas hearth tempering facility is prepared to receive glass from each sample set as indicated below. The furnace has the following dimensions: overall heated length, 66 feet; preheat zone having radiant electric heaters and a glass supporting roller conveyor, 30 feet; and gas hearth having a gas support bed and disk drive, 36 feet. Top and bottom quench air can be supplied following the furnace exit with an adjustable gap between the top and bottom blowers. The gap is set at about 0.28 inch.

In an initial test 0.125-inch glass is processed at a throughput rate of 500 inches per minute with an elapsed time of about 6 seconds between pieces of glass. Plenum air pressure is adjusted to about 34 ounce per square inch top pressure and about 33 ounce per square inch bottom pressure. Ultimate temper is satisfactory and losses in the furnaces are about 0.5 percent — comparable to that for commercial float glass similarly processed.

Although normal line speed for processing commercial float glass on the particular equipment used in these tests is 500 inches per minute in order to obtain full temper, the mechanical limit on the equipment is 600 inches per minute. Thus, tests have been conducted to determine if the glass of Example I has sufficiently improved tempering propensity to permit greater throughput while obtaining full temper. About 60 pieces of 0.125-inch glass are passed through the furnace at 600 inches per minute at 5 second intervals between pieces. The preheat section temperature is raised from the normal 1,470°F to 1,500°F and the plenum air pressure is maintained as that of the previous test.

Glass plates from the beginning, middle and end of the run are edge taped and broken. Particle size is small indicating complete tempering.

Since buffeting caused by quench air can cause bending of the hot glass entering the quench, excessive quench air pressures are desirably avoided to prevent bending glass out of its desired shape. Lower air pressures also require lower fixed and continuing blower costs than higher pressures. Nevertheless, sufficient air pressure must be provided to temper the glass being processed. In a series of tests it has been established that the improved tempering propensity of the glasses here disclosed permits use of lower quench air pressure while obtaining full tempering.

Using a line speed of 550 inches per minute and an interval between pieces of glass of 6 seconds sets of glass having about 25 to about 50 pieces each are tempered at different quench air pressures: 32, 25, 20, 15 and 10 ounces per square inch of air both above and below the glass. In addition to control samples of 0.125 inch commercial float glass, samples of 0.125 inch and 0.090 inch glass having the composition of Example I are tempered. The results of those tests, which are summarized in Tables IV and V, indicate that 0.125 inch glass having a high tempering propensity can be tempered at low quench air pressures and that 0.090 inch glass having improved tempering propensity can be tempered whereas 0.090 inch commerical float glass cannot be successfully tempered using conventional equipment and conditions.

The particle sizes of Tables IV and V are determined by the method described above. The center tension indicated is determined by the technique described above. The surface tension is determined using the differential surface refractometry technique fully described in Ansevin, R. W., "Nondestructive Measurement of Surface Stresses in Glass," *ISA Transactions* 4, (4), October, 1965.

TABLE IV.—EFFECT OF QUENCH AIR PRESSURE ON TEMPERING 0.125-INCH GLASS

| Type of glass | Line speed, inches/ minute | Air pressure, oz./sq. in. (top and bottom) | Particle size, grams | Surface compression, lb./sq. in. | Center tension, mμ/inch |
|---|---|---|---|---|---|
| Commercial Float | 450 | 32 | .56 | 23,545 | 4,620 |
| Do | 600 | 32 | .39 | | |
| Do | 550 | 10 | 26.61 | | |
| B₂O₃ glass | 500 | 32 | .06 | | |
| Do | 550 | 32 | .10 | 18,750 | 4,140 |
| Do | 550 | 32 | .11 | | |
| Do | 550 | 32 | .07 | 19,620 | 4,520 |
| Do | 600 | 32 | .13 | 24,415 | 4,505 |
| Do | 600 | 32 | .09 | 22,235 | 4,885 |
| Do | 600 | 32 | .21 | 23,108 | 4,220 |
| Do | 550 | 25 | .18 | | |
| Do | 550 | 20 | .18 | 18,750 | 4,845 |
| Do | 550 | 15 | .26 | 20,490 | 3,995 |
| Do | 550 | 10 | .28 | 19,620 | 3,955 |

TABLE V.—EFFECT OF QUENCH AIR PRESSURE ON TEMPERING 0.090-INCH GLASS

| Type of glass | Line speed, inches/ minute | Air pressure, oz./sq. in. (top and bottom) | Particle size, grams | Surface compression, lb./sq. in. | Center tension, mμ/inch |
|---|---|---|---|---|---|
| Commercial float | | | Could not process | | |
| B₂O₃ glass | 550 | 32 | 1.76 | | |
| Do | 550 | 32 | .54 | 22,235 | 3,980 |
| Do | 550 | 40 | .31 | | |
| Do | 550 | 40 | .44 | 21,800 | 4,710 |
| Do | 550 | 40 | .33 | 19,620 | 4,480 |
| Do | 550 | 40 | .39 | 23,545 | 4,740 |

The volume change of glasses due to temperature change within the strain point-to-softening point is estimated by determining the volume change due to temperature variation at relatively low temperatures above about 60°F and at high temperatures at which the glass is molten and extrapolating each determination toward the strain point and softening point respectively.

Thermal expansion of the solid glass from about room temperature to about 575°F is determined according to ASTM-E-228-66aT.

High temperature variation in density is determined by the volumetric method proposed by Shartsis et al., Shartsis, L. and Spinner, S., "Viscosity and Molten Density of Optical Glasses," *Jour. Research N.B.S.*, 46 (3), March, 1957. A platinum-rhodium flask having a base diameter of about 6 cm and a neck 5 cm high and 2 cm diameter is provided with a conically tipped platinum-rhodium rod which may be controllably moved into the neck with its position monitored. After calibrating the flask and rod for volume and length change with temperature variation at about room temperature, the flask is filled with an amount of glass so that the level of glass when molten is in the narrow neck. As the temperature of the apparatus and glass is varied, the rod is positioned to contact the glass surface (contact is determined by testing for electrical continuity between the rod and flask through the molten glass using a standard ohmeter, such as Simpson meter) and the rod position is converted to glass volume according to the prior calibration. During these volume determinations the temperature of the glass is varied up or down with no apparent dependence upon the order of testing.

Data for both high and low temperature testing is converted to specific volume and plotted against temperature as in FIG. 1. Low temperature data for each glass is linearly extended toward the strain point and high temperature data for each glass is extended toward the softening point temperature—as shown in FIG. 1. Interpolation between the softening point and strain point establishes a rate of volume change during transformation.

It is apparent from FIG. 1 that glass which shows a high propensity for tempering differs from ordinary lime-soda-silica glass in its rate of apparent volume change above the strain point. It has long thought that glasses having high coefficients of expansion below the strain point should temper well. But, as demonstrated here, a glass having a comparable coefficient of expansion to that of ordinary lime-soda-silica glass can have a superior propensity for tempering if it possesses substantial volume change due to temperature variation in a short strain point-to-softening point interval similar to that of the preferred compositions discussed here.

The variation of molten density with temperature change is determined with a precision of about 0.5 percent or better. The specific densities are shown here.

TABLE VI

Molten Density gm./cc

| Float Temperature | Density | B₂O₃ Glass, Ex. I Temperature | Density |
|---|---|---|---|
| 2500°F | 2.280 | 2402°F | 2.283 |
| 2385°F | 2.295 | 2303°F | 2.291 |
| 2303°F | 2.305 | 2199°F | 2.302 |
| 2201°F | 2.313 | 2099°F | 2.314 |
| 2109°F | 2.323 | 2003°F | 2.325 |
| 2002°F | 2.334 | 1902°F | 2.336 |

Figure 2:
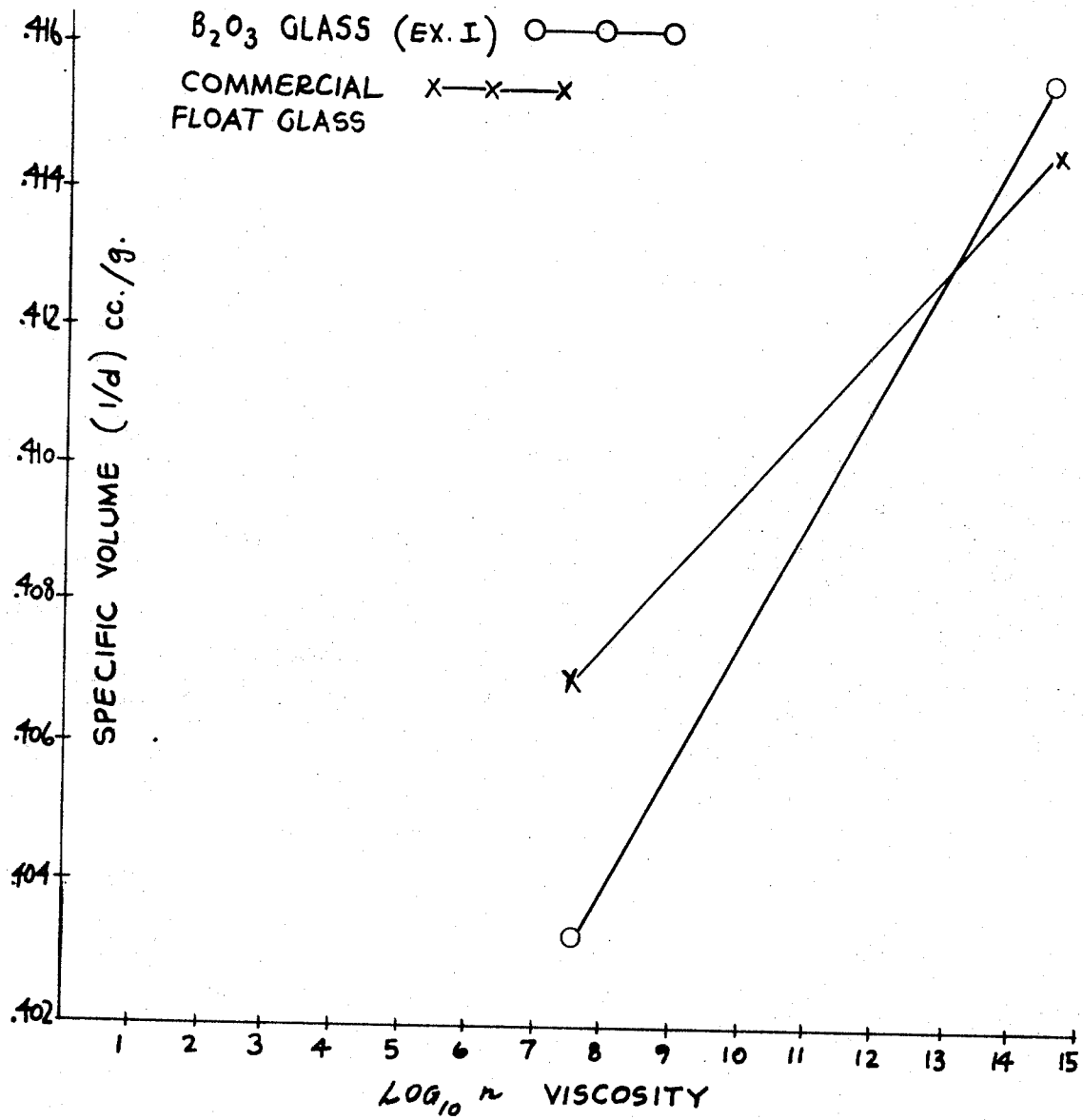

The large and rapid specific volume change with changing temperature over the short strain point-to-softening point interval of this glass found useful for tempering is compared with the characteristics of float glass as seen in FIGS. 1 and 2 and summarized below.

TABLE VII

Comparison of Properties In Stress-Softening Interval

| | Float Glass | B₂O₃ Glass-Ex. I |
|---|---|---|
| Softening Point | 1338°F | 1283°F |
| Strain Point | 945°F | 945°F |
| Interval | 393°F | 338°F |
| Specific Volume Softening Point | .4145 cc/gm. | .4155 cc/gm. |

| | | |
|---|---|---|
| Strain Point | .4070 cc/gm. | .4033 cc/gm. |
| Change | .0075 cc/gm | .0122 cc/gm. |
| Rate of Change | $1.098 \times 10^{-5}$ cc/gm./°F | $3.609 \times 10^{-5}$ cc/gm./°F |

The applicants' discovery, as indicated by the examples and discussion above, is not limited to the use of specific glass compositions in a thermal tempering process. The applicants have discovered and disclosed improvements in the thermal tempering of glass and in thermally tempered glass articles which comprise the utilization of glasses having physical properties in the temperature range of thermal tempering not before considered.

Although the present invention has been described with reference to specific details of certain embodiments, it is not intended that such details act as limitations upon the scope of the invention except insofar as included in the accompanying claims.

We claim:

1. A method for enhancing the thermal tempering propensity and for thermally tempering alkali-alkaline earth-silica flat glass articles comprising:
    a. adding a source of $B_2O_3$ and/or $TiO_2$ to alkali-alkaline earth-silica glass making ingredients to form a glass batch,
    b. melting the batch to form a glass melt,
    c. cooling the glass melt, and subsequently therewith
    d. forming a flat glass article which has the following composition on a weight basis: 60 to 75 percent $SiO_2$, 0 to 15 percent CaO, 0 to 10 percent MgO, the combined weight of CaO and MgO ranging from 5 to 15 percent, 5 to 24 percent $Na_2O$, 0 to 21 percent $K_2O$, the combined weight of $Na_2O$ and $K_2O$ ranging from 5 to 24 percent, 1.7 to 22.4 percent $B_2O_3$ and/or 1.4 to 10 percent $TiO_2$, the combined weight of $B_2O_3$ and $TiO_2$ ranging from 2.5 to 22.4 percent; the percentages of the components of the composition being adjusted so that the difference between the softening point and the strain point of such glass is not in excess of 350°F. and the rate of specific volume change with respect to the temperature change in the strain point-to-softening point interval is at least $2.8 \times 10^{-5}$ cubic centimeters/gram/degree Fahrenheit,
    e. heating said flat glass article to a temperature above the strain point, followed by
    f. contacting the heated glass article with a quenching fluid to rapidly cool the article to a temperature below the strain point to form a thermally tempered alkali-alkaline earth-silica flat glass article with a high degree of compressive stress in the surface of the article.

2. The process of claim 1 wherein sufficient quenching fluid is supplied to the flat glass article to develop in the surface a compressive stress of at least 18,000 pounds per square inch.

3. A thermally tempered flat glass article prepared by the process of claim 1.

4. The tempered flat glass article of claim 3 wherein the glass is not in excess of one-eighth inch thick.

5. The tempered flat glass article of claim 3 wherein compressive stress at the surface of the glass is at least 18,000 pounds per square inch.

* * * * *